(12) United States Patent
Cahill (10) Patent No.: US 7,498,123 B2
(45) Date of Patent: Mar. 3, 2009

(54) INFRARED DYE COMPOSITIONS (75) Inventor: Paul A. Cahill, Dayton, OH (US)

(73) Assignee: Exciton, Inc., Dayton, OH (US)

( * ) Notice: Subject to any disclaimer, the term of this patent is extended or adjusted under 35 U.S.C. 154(b) by 476 days.

(21) Appl. No.: 11/071,509

(22) Filed: Mar. 3, 2005

(65) Prior Publication Data
US 2006/0199105 A1 Sep. 7, 2006

(51) Int. Cl.
G03C 1/00 (2006.01)
(52) U.S. Cl. .............. 430/339; 430/108.2; 430/270.1; 430/338; 430/340; 430/905; 430/916; 430/944; 522/1; 522/31
(58) Field of Classification Search ........... 430/106, 430/108.2, 270.1, 340, 338, 339, 905, 916, 430/944; 8/550; 522/1, 31
See application file for complete search history.

(56) References Cited

U.S. PATENT DOCUMENTS

| 3,341,464 | A | 9/1967 | Susi et al. |
|---|---|---|---|
| 3,400,156 | A | 9/1968 | Milionis et al. |
| 3,440,257 | A | 4/1969 | Susi et al. |
| 3,484,467 | A | 12/1969 | Susi et al. |
| 3,575,871 | A | 4/1971 | Susi et al. |
| 3,631,147 | A | 12/1971 | Susi et al. |
| 3,962,290 | A | 6/1976 | Grosso |
| 5,210,122 | A | 5/1993 | Fontana et al. |
| 5,245,030 | A | 9/1993 | Fukui et al. |
| 5,326,799 | A | 7/1994 | Fontana et al. |
| 5,362,592 | A * | 11/1994 | Murofushi et al. ..... 430/108.14 |
| 5,434,197 | A | 7/1995 | Cohen |

(Continued)

FOREIGN PATENT DOCUMENTS

DE 3938006 A1 5/1990

(Continued)

OTHER PUBLICATIONS

Otto Neunhoeffer et al., Das Tris-[p-dimethylamino-phenyl]-ammeneiumkation, ein durch Mesomeric Stabllisiertes, bestandiges, freies Sticksoffradikal, Aus dem II, Chemischen Institut der Humboldt-Universitat Berlin (Eingegangen am Sep. 29, 1958); English Translation of abstract only, Chemical Abstracts, 53:10083.

(Continued)

Primary Examiner—Lorna M Douyon
Assistant Examiner—Tri V Nguyen
(74) Attorney, Agent, or Firm—Wood, Herron & Evans, L.L.P.

(57) ABSTRACT

Disclosed are novel aminium, diimonium, and polymethine borate dyes that have at least one absorption maximum in the infrared spectral region between about 700 and 2000 nm and that are useful as infrared absorbers, the anionic borate moiety having the formula: $[BX_aY_b]^-$, in which a and b are integers with a ranging from 0 to 3 and b ranging from 1 to 4 and a+b=4; X, which may be identical or different, are each a halogen atom, an OH functional group, or a $C_1$ to $C_{20}$ alkyl or alicyclic radical, and Y, which may be identical or different, are each a phenyl radical, at least one Y substituted by at least one element or electron-withdrawing substituent such as a perfluoroalkyl group, or by one or more halogen atoms, or an aryl radical containing at least two aromatic ring members, which may also be further substituted. Such dyes may be incorporated into films or bulk materials to form light filters for electromagnetic radiation, including laser radiation.

7 Claims, 3 Drawing Sheets

U.S. PATENT DOCUMENTS

| | | | |
|---|---|---|---|
| 5,468,902 A | 11/1995 | Castellanos et al. | |
| 5,550,265 A | 8/1996 | Castellanos et al. | |
| 5,607,803 A * | 3/1997 | Murofushi et al. | 430/108.1 |
| 5,668,192 A | 9/1997 | Castellanos et al. | |
| 5,686,639 A | 11/1997 | Cohen | |
| 5,814,427 A * | 9/1998 | Murofushi et al. | 430/109.3 |
| 5,999,780 A * | 12/1999 | Mort et al. | 399/266 |
| 6,147,184 A | 11/2000 | Castellanos et al. | |
| 6,475,590 B1 * | 11/2002 | Kitayama et al. | 428/64.8 |
| 6,500,816 B1 * | 12/2002 | Ekimoto et al. | 514/185 |
| 2002/0114966 A1 * | 8/2002 | Urano | 428/522 |
| 2004/0130771 A1 * | 7/2004 | Carlson | 359/244 |
| 2004/0184173 A1 | 9/2004 | Kobayashi et al. | |

FOREIGN PATENT DOCUMENTS

| | | |
|---|---|---|
| EP | 0554627 A1 | 8/1993 |
| WO | 0246263 A1 | 6/2002 |
| WO | 02070254 A1 | 9/2002 |
| WO | 2004058699 A2 | 7/2004 |

OTHER PUBLICATIONS

Masaru Matsuoka, *Absorption Spectra of Dyes for Diode Lasers*, JOEM Handbook 2, Bunshin Publishing Co., Tokyo Japan, 1990.

Jurgen Fabian, *Near-Infrared Absorbing Dyes*, Chem. Rev., 1992, 92, 1197-1226.

European Patent Office, International Search Report and Written Opinion in PCT Application Serial No. PCT/US2006/007500, Jul. 11, 2007.

* cited by examiner

INFRARED DYE COMPOSITIONS

BACKGROUND OF THE INVENTION

1. Field of the Invention

The present invention relates to fluorescent and non-fluorescent infrared light absorbing dyes for use in filters or sensing materials and, more particularly, to thermally stable and highly soluble dyes including aminium, diimonium, or polymethine cationic chromophores having at least one absorption maximum between about 700 nm and 2000 nm and borate counterions.

2. Description of the Prior Art

There are many applications in which dyes, including infrared light absorbing dyes, when dissolved or dispersed in a host liquid, solid, or gel provide light absorption and, in some cases, fluorescent or phosphorescent light emission. For example, non-luminescent or poorly luminescent infrared dyes are used in light filters (luminescence being understood to encompass all light emission whether by fluorescence, phosphorescence, or an undetermined emission mechanism). Infrared light filters are utilized in sensors, including solid state detectors, photodiode arrays, imaging sensors, such as a charge-coupled device (CCD) or complementary metal-oxide semiconductor (CMOS) arrays, and other imaging devices, to shape the sensitivity curve of a broadly photosensitive element(s), e.g., by absorbing invisible light to provide a sensor sensitivity curve similar to that of the eye. Filters comprising such infrared absorbing dyes are also used to protect sensors or the eye from infrared radiation, e.g., laser radiation, or other sources of infrared light such as welding operations.

Infrared wavelength filters may also be used to diminish the intensity of the infrared light energy emitted from the sun, illumination sources, information displays, including cathode ray tubes (CRTs), liquid crystal and plasma displays, light emitting diodes, and other emissive technologies such as organic light-emitting diodes (OLEDs), especially in cases where such infrared light sources may interfere with the operation of sensors. Infrared absorbers may also be used to provide infrared blocking in otherwise infrared transparent or partially infrared transparent plastic articles, e.g. banking or credit cards, in which visibly partially transparent plastics provide for marketing or security features. Infrared dyes may also be used in cell biology applications, in inks, or in heat activated compositions.

In addition to these and other applications of non-emissive infrared dyes, emissive infrared dyes are used, for example, in laser devices and laser applications, in security inks, in sensors, and in biological or medical analyses. The infrared emissive dyes may also be used in inks or heat activated compositions.

Infrared absorbing and emitting dyes have a long history and thousands of compositions are known. The often fluorescent polymethine class of chromophores were among the first infrared dyes. Infrared absorbers may also be categorized into several other classes of chemical compounds including, among others, the phthalocyanines and their metal complexes, naphthalocyanines and their metal complexes, anthraquinone derivatives, dithiolenes (also known as metal complex dyes), aminium salts, and diimonium salts. Of these, generally some polymethines, some phthalocyanines, and some naphthalocyanines have infrared emission. Also, polymethines and unsubstituted phthalocyanines and naphthalocyanines have relatively narrower absorption spectra than dithiolenes, anthraquinone derivatives, aminium salts or diimonium salts. Both narrow and broad band absorbers are useful because each has performance advantages in certain applications.

The first report of the spectral properties of infrared light absorbing aminium dyes was by Otto Neunhoeffer and Peter Heitmann (See Neunhoeffer et al., Chemische Berichte 92, 245-251 (1959)). Subsequent development of these dyes at the American Cyanamid Company of Stamford, Conn. by Peter Susi and colleagues is reported in the patent literature (See U.S. Pat. Nos. 3,341,464, 3,440,257, 3,484,467, 3,575,871, and U.S. Pat. No. 3,631,147 to Susi et. al., U.S. Pat. No. 3,400,156 to Milionis et al., and U.S. Pat. No. 3,962,290 to Grosso). Various other patents disclose methods of preparation of intermediates and the use of such aminium salts as infrared absorbing components of light filters.

The limited thermal stability of the aminium and related diimonium salts was immediately recognized. Studies showed that the hexafluoroantimonate ($SbF_6^-$) and, to a somewhat lesser degree, hexafluoroarsenate ($AsF_6^-$) salts of the aminium ions, as shown in Table I below taken from U.S. Pat. No. 3,341,464 to Susi et al., were the most stable, i.e., these salts showed the greatest retention of optical density upon exposure to high temperature.

TABLE I

Relative Thermal Stability of Representative Aminium Salts

| Anion | Percent Remaining after 8 minutes in a 200-205° C. oil bath |
|---|---|
| $SbF_6^-$ | 76 |
| $AsF_6^-$ | 70 |
| $ClO_4^-$ | 49 |
| $p\text{-}CH_3C_6H_4SO_3^-$ | 37.6 |
| $BF_4^-$ | 25 |
| $F^-$ | 23.5 |
| $EtSO_3^-$ | 19.5 |
| $CF_3CO_2^-$ | 4.2 |
| $NO_3^-$ | 0 |

Therefore, it is not surprising that the most thermally stable hexafluoroantimonate salts of both the aminium and diimonium chromophores have been widely used as infrared absorbing components. Note, however, that the thermal decomposition of certain diimonium salts can, in some cases, be useful in some applications. For example, U.S. Pat. No. 5,686,639 to Cohen discloses the use of quinone diimonium hexafluoroantimonate salts as epoxy curing agents. The diimonium dyes are much less thermally stable than the aminium compounds.

The limited solubility of polymethine, aminium, and diimonium salts containing counterions such as hexafluoroantimonate, hexafluoroarsenate, perchlorate, hexafluorophosphate, tetrafluoroborate, tosylate, etc., is most apparent in applications that require high optical densities in a low polarity host. For example, IR-140, a commercially available infrared dye, has very limited solubility in toluene or polystyrene as its perchlorate or tosylate salt. Another example is the low solubility of tris(4-diethylaminophenyl)aminium $SbF_6^-$ in a soft contact lens. Here is an example where the required thickness of the part, i.e., the contact lens, is constrained by the application to only on the order of 100 micrometers and, yet, the optical density requirements for infrared light protection can be high. High solubility is therefore required.

More than 20 years after the reported work at the American Cyanamid Company, Frederic Castellanos and his colleagues (hereinafter Castellanos), who were working in applications unrelated to infrared dyes, described a series of ultraviolet light absorbing photoinitiators that were paired with electron poor borate anions, which they termed "onium borates." Specifically, U.S. Pat. Nos. 5,468,902, 5,550,265, 5,668,192, and 6,147,184 to Castellanos et. al., all titled "Onium Borates/Borates of Organometallic Complexes and Cationic Initiation of Polymerization Therewith," describe the compositions and use of UV-absorbing onium borates as cationic polymerization initiators. In addition to absorbing in different parts of the electromagnetic spectrum than the infrared dyes described herein, the onium solution and polymer chemistry described by Castellanos is significantly different from the chemistry of aminium, diimonium, and polymethine dyes. Whereas as Castellanos' UV-absorbing onium salts, as described, are cationic polymerization initiators, many infrared dyes, including the aminium radical salts, are polymerization inhibitors.

Castellanos' fundamental discovery was that onium salts comprised of specific borate anions were at least as effective at catalyzing cationic polymerization as the corresponding onium salts of hexafluoroantimonate anions, and more effective catalysts than the onium salts of, for example, hexafluorophosphate anions. However, Castellanos did not remark on thermal stability or solubility of his onium borates.

One of the most desirable plastics or polymers for use in light filters is polycarbonate. Polycarbonate, also frequently referred to by the General Electric Company trademark Lexan®, can be formulated and molded into various shapes in high temperature processes. Polycarbonate's combination of optical and mechanical properties often makes this material the polymer of choice for ophthalmic as well as other applications. The difficulty of molding aminium infrared absorbers into polycarbonates is well known and is related to the decomposition of these dyes at the relatively high temperatures required to mold polycarbonate. Although non-impact resistant polycarbonate grades may be molded at lower temperatures where the aminium hexafluoroantimonates decompose relatively slowly, molding of impact resistant polycarbonates normally requires barrel temperatures above about 500° F. At these temperatures, even the most thermally stable aminium hexafluoro-antimonates decompose relatively rapidly and consistent molding results can be difficult to obtain.

Furthermore, despite their limited thermal stability and, therefore, their limited utility in higher temperature, higher performance transparent resins, such as lower melt flow index grades of polycarbonate, improvements in the thermal stability of aminium salts have not been reported in over 35 years. Perhaps researchers believed that the thermal stability of the most stable hexafluoroantimonate aminium dyes was limited not by the nature of the anion, but by the stability of the cation itself, or by reaction of the cation with the host liquid or polymer at melt processing temperatures.

One path to a solution to fabricate polycarbonate light filters that reduces the thermal decomposition of the previously described aminium dyes has been the development of polycarbonate blends that can be processed at temperatures where the aminium $SbF_6^-$ dyes decompose relatively slowly. Such polymer compositions or blends have been disclosed, for example, in U.S. Pat. Nos. 5,210,122 and 5,326,799 to L. P. Fontana et al., and U.S. Pat. No. 5,434,197 to L. A. Cohen. However, one disadvantage of this approach is that the haze of at least one such material, e.g., General Electric Company's Xylex® X7200, is higher than that of unblended, ophthalmic or "OQ" grade polycarbonates. Therefore, this polymer blend approach has limitations for impact resistant filters in optical filter applications.

More recently, absorptive dyes have also been combined with reflective or diffractive elements, e.g., rugates, dielectric stacks, holograms, and other types of coatings that provide complementary or supplementary filtration of wavelengths or wavelength bands, in order, for example, to fabricate highly effective optical filters. The deposition of these coatings may result in substrate temperatures that exceed the distortion temperatures of the non-impact resistant grades of polycarbonate. Therefore, it is desirable to provide absorbing substrates in higher temperature grades of polycarbonate in applications where dyes and coatings are both used.

Accordingly, one objective of the present invention is to provide infrared light absorbing dyes that are capable of absorbing light in the range of about 700 to 2000 nm.

It is another objective of the present invention to provide infrared light absorbing and light emitting light filters, materials, films, solutions, coatings, or inks.

It is another objective of the present invention to provide infrared light absorbing dyes that can be processed at high temperatures, e.g., in polycarbonate molding operations.

It is another objective of the present invention to provide infrared light absorbing dyes that are soluble in non-polar or low polarity solvents or polymers.

It is another objective of the present invention to provide a light filter, material, film, solution, coating or ink that is capable of absorbing light in the range of about 700 to 2000 nm.

It is another objective of the present invention to provide a light filter, material, film, solution, coating or ink that transmits a substantial portion of light at visible wavelengths.

It is another objective of the present invention to provide aminium and diimonium dyes with greater thermal stability than those comprised of hexafluoroantimonate anions.

It is another objective of the present invention to provide aminium and diimonium dyes with greater solubility in non-polar hosts than those comprised of hexafluoroantimonate anions.

It is another objective of the present invention to provide polymethine dyes with greater solubility in non-polar hosts than those comprised of perchlorate or tosylate anions.

It is another objective of the present invention to prepare infrared light absorbing cationic dyes with counterions that lack potentially toxic anions such as perchlorate or toxic heavy atoms, e.g. antimony or arsenic.

It is another objective of the present invention to provide light filters capable of filtering out undesirable, harmful, or dangerous wavelengths of infrared light.

It is another objective of the present invention to prepare filters for electromagnetic radiation, including laser radiation, that are comprised of thermally stable infrared absorbing dyes, alone, or in combination with other absorbing dyes, stabilizers, or other non- or weakly visible light absorbing additives such as UV-absorbers, light stabilizers, anti-oxidants or free radical trapping agents.

It is another object of the present invention to prepare filters for electromagnetic radiation, including laser radiation, that are comprised of highly organic-soluble infrared absorbing dyes, alone, or in combination with other absorbing dyes, stabilizers, or other non- or weakly visible light absorbing additives such as UV-absorbers, light stabilizers, anti-oxidants or free radical trapping agents.

It is another objective of the present invention to prepare filters for electromagnetic radiation in forms such as spectacles, visors, and contact lenses.

It is another objective of the present invention to prepare dyes that are chemically, thermally, and photochemically compatible with optical filter, material, film, solution, coating or ink manufacturing processes, and with processes for depositions of subsequent coatings, if any. Such processes may include molding, casting, imbibing, thermal curing, and radiation or UV curing, among others.

It is another objective of the present invention to improve the manufacturing-related metrics of reproducibility and consistency of the transmittance and optical density of filters, materials, films, solutions, coatings or inks containing infrared absorbing dyes.

It is another objective of the present invention to reduce the cost of manufacturing infrared absorbing filters by minimizing the additional amount of dye that is often required to make up for decomposition of less thermally stable infrared absorbing dyes.

It is another objective of the present invention to increase the luminous transmission of infrared absorbing filters, materials, films, solutions, coatings or inks by reducing the decomposition of thermally sensitive infrared absorbing dyes.

It is another objective of the present invention to provide filters, materials, films, solutions, coatings or inks comprising infrared absorbing dyes from plastic resins that are compatible with processes used to deposit coatings on polymeric substrates.

It is another objective of the present invention to provide filters from plastic resins that are optionally impact resistant. Such plastic resins and filters are optionally polycarbonate. Such plastic resins and filters are optionally of ophthalmic quality. Such plastic resins and filters optionally offer impact or ballistic protection. The filters, films, or substrates may be in any shape useful to their end-purpose, e.g., a curved lens or visor for eye protection or a flat sheet for a vision system.

It is another objective of the present invention to develop a process for and provide filters in the form of a contact lens. Such contact lens resins may include polymethylmethacrylate (PMMA), poly(beta-hydroxyethyl methylmethacrylate), or any high oxygen permeability polymer. The filters, films, or substrates may be in any shape useful to their end-purpose, i.e., standard diameter or oversize to protect the cornea, and scripted as required for the individual.

It is another objective of the present invention to prepare notch, long pass, short pass, and band pass filters for optical filter applications by substituting known infrared absorbing dyes with at least one of the dyes disclosed herein into or onto a substrate that is optionally compatible with absorptive and/or diffractive and/or reflective coatings and coating processes.

It is another objective of the present invention to provide infrared absorbing and/or infrared emitting products for materials including polystyrene and other low polarity materials that find use in cell biology applications.

The present invention achieves these objectives and addresses the weaknesses and drawbacks of previously proposed infrared dyes by providing infrared dye compositions comprising polymethine, aminium, or diimonium borate salts, and related compositions, having greater thermal stability in molding and greater solubility, which is most apparent in non-polar solvents and hosts. These compositions are useful in a variety of applications, including those where high transmittance across much of the visible light spectrum and low transmittance at certain wavelengths in the infrared are required. For example, the compositions may be used in information displays such as holographic displays, as filters for laser radiation, as filters for illumination sources, as filters for photographic processes, and as filters for light emitting diodes including organic light emitting diodes, in security inks, in eye protection including contact lenses, and in sensors, including infrared fluorescent sensors of all types.

SUMMARY OF THE INVENTION

In one embodiment of the invention, there is provided an infrared dye composition comprising an infrared light absorbing aminium borate salt of formula I:

in which m and n are integers ranging from 0 to 3 and m+n ranges from 0 to 3; groups $R^1$, $R^2$ and $R^3$ are identical or different, optionally are linked to form rings, optionally linked to an oligomer or polymer, and are each a $C_6$ to $C_{20}$ heterocyclic or carbocyclic aryl radical, said groups $R^1$, $R^2$ and $R^3$ optionally being substituted by at least one $C_1$-$C_{25}$ alkoxy, $C_1$-$C_{25}$ alkyl, halo, $C_1$-$C_{25}$ mercapto, or amino group, the amino group being further incorporated into a carbocyclic or heterocyclic ring or substituted by at least one $C_1$-$C_{20}$ alkyl, alicyclic, or arylalkyl group, at least one $C_6$ to $C_{20}$ heterocyclic or carbocyclic aryl radical, or at least one $C_1$-$C_{20}$ alkyl, alicyclic, or arylalkyl group and a $C_6$ to $C_{20}$ heterocyclic or carbocyclic aryl radical, the aryl radical further optionally substituted with $R^1$ groups fitting the definition above; and in which a and b are integers and a ranging from 0 to 3 and b ranging from 1 to 4 and a+b=4; X, which may be identical or different, are each a halogen atom, an OH functional group, or a $C_1$ to $C_{20}$ alkyl or alicyclic radical, and Y, which may be identical or different, are each a phenyl radical, at least one Y substituted by at least one element or electron-withdrawing substituent, such as a perfluoroalkyl group, or by one or more halogen atoms, or an aryl radical containing at least two aromatic ring members, optionally being further substituted by an electron withdrawing substituent.

In one exemplary embodiment, $R^1$=$R^2$=$R^3$=4-dibutylaminophenyl and the counterion, or $[BX_aY_b]^-$, is $(C_6F_5)_4B^-$ to provide tris(4-dibutylaminophenyl)aminium tetrakis(pentafluorophenyl)borate.

In another embodiment, the infrared light absorbing aminium borate salt of formula I may further include a host associated therewith to form, for example, an optical filter capable of filtering light. The host is generally either a liquid, gel or a solid.

In one exemplary embodiment, $R^1$=$R^2$=$R^3$=4-dibutylaminophenyl, the counterion, or $[BX_aY_b]^-$, is $(C_6F_5)_4B^-$, and the host is polycarbonate. The resulting filter has a peak absorption in the infrared in polycarbonate at about 1005 nm. In another exemplary embodiment, $R^1$'$R^2$=$R^3$=4-diethylaminophenyl, the counterion, or $[BX_aY_b]^-$, is $(C_6F_5)_4B^-$, and the host is polycarbonate. The resulting filter has a peak absorption in the infrared at about 990 nm. In yet another exemplary embodiment, $R^1$=$R^2$=$R^3$=4-diethylaminophenyl, the counterion, or $[BX_aY_b]^-$, is $(C_6F_5)_4B^-$, and the host is a soft contact lens. The resulting lens has a peak absorption in the infrared at about 985 nm.

In another embodiment of the invention, there is provided an infrared dye composition comprising an infrared light-absorbing aminium borate salt of formula II:

in which $R^1$ through $R^4$ are identical or different, optionally are linked to form rings, optionally linked to an oligomer or polymer, and are each a $C_6$ to $C_{20}$ heterocyclic or carbocyclic aryl radical, said groups $R^1$ through $R^4$ optionally being substituted by at least one $C_1$-$C_{25}$ alkoxy, $C_1$-$C_{25}$ alkyl, halo, $C_1$-$C_{25}$ mercapto, or amino group, the amino group being further incorporated into a carbocyclic or heterocyclic ring or substituted by at least one $C_1$-$C_{20}$ alkyl, alicyclic, or arylalkyl group, at least one $C_6$ to $C_{20}$ heterocyclic or carbocyclic aryl radical, or at least one $C_1$-$C_{20}$ alkyl, alicyclic, or arylalkyl group and a $C_6$ to $C_{20}$ heterocyclic or carbocyclic aryl radical, the aryl radical further optionally substituted with $R^1$ groups fitting the definition above; and in which a and b are integers and a ranging from 0 to 3 and b ranging from 1 to 4 and a+b=4; X, which may be identical or different, are each a halogen atom, an OH functional group, or a $C_1$ to $C_{20}$ alkyl or alicyclic radical, and Y, which may be identical or different, are each a phenyl radical, at least one Y substituted by at least one element or electron-withdrawing substituent, such as a perfluoroalkyl group, or by one or more halogen atoms, or an aryl radical containing at least two aromatic ring members, optionally being further substituted by an electron withdrawing substituent.

In one exemplary embodiment, $R^1$ through $R^4$=di(n-butyl) aminophenyl and the counterion, or $[BX_aY_b]^-$, is $(C_6F_5)_4B^-$ to provide bis(p-dibutyl aminophenyl)[N,N-bis(p-dibutylaminophenyl)-4'-aminobiphenylyl]aminium tetrakis(pentafluorophenyl)borate.

In another embodiment, the infrared light absorbing aminium borate salt of formula II may further include a host associated therewith to form, for example, an optical filter capable of filtering light. The host is generally either a liquid, gel or a solid.

In one exemplary embodiment, $R^1$ through $R^4$=di(n-butyl) aminophenyl, the counterion, or $[BX_aY_b]^-$, is $(C_6F_5)_4B^-$, and the host is toluene.

In yet another embodiment of the invention, there is provided an infrared dye composition comprising an infrared light-absorbing diimonium borate salt of formula III:

$$[(R^1R^2)N=Ar=N(R^3R^4)]^{2+}[Z_1]^-[Z_2]^- \quad \text{III.}$$

in which Ar is a substituted or unsubstituted quinoidal phenyl, $R^1$ through $R^4$ are identical or different, optionally are linked to form rings, optionally linked to an oligomer or polymer, and are each either a $C_1$-$C_{20}$ alkyl, alicyclic, or arylalkyl group or a $C_6$ to $C_{20}$ heterocyclic or carbocyclic aryl radical, said groups $R^1$ through $R^4$ optionally being substituted by at least one $C_1$-$C_{25}$ alkoxy, $C_1$-$C_{25}$ alkyl, halo, $C_1$-$C_{25}$ mercapto, or amino group, the amino group being further incorporated into a carbocyclic or heterocyclic ring or substituted by at least one $C_1$-$C_{20}$ alkyl, alicyclic, or arylalkyl group, at least one $C_6$ to $C_{20}$ heterocyclic or carbocyclic aryl radical, or at least one $C_1$-$C_{20}$ alkyl, alicyclic, or arylalkyl group and a $C_6$ to $C_{20}$ heterocyclic or carbocyclic aryl radical, the aryl radical further optionally substituted with $R^1$ groups fitting the definition above; and one of $[Z_1]^-$ and $[Z_2]^-$ being selected from $SbF_6^-$, $ClO_4^-$, $AsF_6^-$, $PF_6^-$, $CF_3SO_3^-$, $BF_4^-$, and $[BX_aY_b]^-$, the other one of $[Z_1]^-$ and $[Z_2]^-$ of the form $[BX_aY_b]^-$, if each of $[Z_1]^-$ and $[Z_2]^-$ are of the form $[BX_aY_b]^-$ then each being identical or different, a and b of $[BX_aY_b]^-$ are integers and a ranging from 0 to 3 and b ranging from 1 to 4 and a+b=4; X, which may be identical or different, are each a halogen atom, an OH functional group, or a $C_1$ to $C_{20}$ alkyl or alicyclic radical, and Y, which may be identical or different, are each a phenyl radical, at least one Y substituted by at least one element or electron-withdrawing substituent, such as a perfluoroalkyl group, or by one or more halogen atoms, or an aryl radical containing at least two aromatic ring members, optionally being further substituted by an electron withdrawing substituent In one exemplary embodiment, Ar=$C_6H_4$, $R^1$ through $R^4$=di(n-butyl)aminophenyl and the counterions, or $[Z_1]^-$ and $[Z_2]^-$, are both $(C_6F_5)_4B^-$ to provide N,N,N',N'-tetrakis(p-dibutylaminophenyl)diphenoquinonebis[imonium tetrakis (pentafluorophenyl)borate].

In another embodiment, the infrared light absorbing diimonium borate salt of formula III may further include a host associated therewith to form, for example, an optical filter capable of filtering light. The host is generally either a liquid, gel or a solid.

In one exemplary embodiment, Ar=$C_6H_4$, $R^1$ through $R^4$=di(n-butyl)aminophenyl, the counterions, or $[Z_1]^-$ and $[Z_2]^-$, are both $(C_6F_5)_4B^-$, and the host is a soft contact lens.

In yet another embodiment of the invention, there is provided an infrared dye composition comprised of an infrared light-absorbing polymethine chromophore with a borate counterion of formula IV:

$$[\text{polymethine}]^+[BX_aY_b]^- \quad \text{IV.}$$

in which a and b are integers and a ranging from 0 to 3 and b ranging from 1 to 4 and a+b=4; X, which may be identical or different, are each a halogen atom, an OH functional group, or a $C_1$ to $C_{20}$ alkyl or alicyclic radical, and Y, which may be identical or different, are each a phenyl radical, at least one Y substituted by at least one element or electron-withdrawing substituent, such as a perfluoroalkyl group, or by one or more halogen atoms, or an aryl radical containing at least two aromatic ring members, optionally being further substituted by an electron withdrawing substituent; and the cationic polymethine chromophore, as represented by [polymethine]$^+$, has a peak in its absorption spectrum between about 700 and 2000 nm and is optionally linked to an oligomer or polymer. These cationic polymethine chromophores are well known to those skilled in the art of infrared dyes. Examples of polymethine dyes with suitable cationic polymethine chromophores include trimethine, pentamethine, heptamethine, chacogenopyrylium, hemicyanine, and streptocyanine dyes.

In one exemplary embodiment, the cationic polymethine chromophore is the IR-140 chromophore, and the borate counterion, or $[BX_aY_b]^-$, is $(C_6F_5)_4B^-$.

In another embodiment of the invention, the infrared light absorbing polymethine chromophore and borate counterion of formula IV may further include a host associated with the light-absorbing polymethine salt to form, for example, an optical filter for filtering light. The host is generally either a liquid, gel or a solid.

In one exemplary embodiment, the cationic polymethine chromophore is the IR-140 chromophore, the borate counterion, or $[BX_aY_b]^-$, is $(C_6F_5)_4B^-$, and the host is polystyrene.

The infrared dye compositions of the present invention can be utilized, such as in processing or molding of infrared filter or sensing elements, at unexpectedly higher temperatures and with unexpectedly greater retention of optical density than currently known infrared dyes containing anions that have been described previously. The infrared dye compositions can also be utilized, such as in processing or molding of infrared filter or sensing elements, in lower polarity or lower polarizable hosts with unexpectedly higher solubility and optical density than currently known infrared dyes containing anions that have been described previously.

By virtue of the foregoing, there are provided infrared dye compositions that are chemically, thermally and photochemically compatible with known manufacturing processes, and with known processes for deposition as coatings or inks.

These and other objects and advantages of the present invention shall be made apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

The present invention includes an infrared dye composition having a polymethine, aminium, or diimonium cationic chromophore and borate anions, or counterions, to define a salt. The infrared dye compositions include greater thermal stability and greater solubility than previously reported compositions and are useful in a variety of applications, for example, in information displays such as holographic displays, as filters for laser radiation, as filters for illumination sources, as filters for photographic processes, and as filters for light emitting diodes including organic light emitting diodes, in security inks, in eye protection including contact lenses, and in sensors, including infrared fluorescent sensors of all types.

As earlier stated, Table I above lists the thermal stability, from most to least stable, of aminium salts as a function of the counterion, as reported in U.S. Pat. No. 3,341,464 to Susi et al., which is hereby fully incorporated by reference herein. The reason for the observed order of stability is not understood. In the past, such compositions have been described as compositions of an aminium cation with the anion of a "strong acid." However, the thermal stability of the aminium salts does not track with acid strength and, therefore, such statements cannot be used to predict the thermal stability of aminium salts.

In addition, although "borate" anions as counterions to the aminium salts have been mentioned in the patent literature, "borate" was not further defined and, therefore, may have referred to salts of boric acid or to tetrafluoro-, tetrachloro-, or possibly tetraphenyl borate. Secondly, no thermal stability data of such "borates," other than tetrafluoroborate, were provided. Furthermore, at the time that the term borate was used, many of the electron poor phenyl borates had not yet been reported. Therefore, the term "borate" salts, as used by Peter Susi and colleagues at the American Cyanamid Company, does not refer to the types of borate salts disclosed herein.

In accordance with one embodiment of the invention, there is provided an infrared dye composition comprising an infrared light absorbing aminium borate salt of formula I:

An aminium radical cation being represented by $[(R^1)_m]$ $[(R^2)_n][(R^3)_{3-(m+n)}]N^{+\bullet}$, in which m and n are integers ranging from 0 to 3 and m+n ranges from 0 to 3; groups $R^1$, $R^2$ and $R^3$ are identical or different, optionally are linked to form rings, optionally linked to an oligomer or polymer, and are each a $C_6$ to $C_{20}$ heterocyclic or carbocyclic aryl radical, said groups $R^1$, $R^2$ and $R^3$ optionally being substituted by at least one $C_1$-$C_{25}$ alkoxy, $C_1$-$C_{25}$ alkyl, halo, $C_1$-$C_{25}$ mercapto, or amino group, the amino group being further incorporated into a carbocyclic or heterocyclic ring or substituted by at least one $C_1$-$C_{20}$ alkyl, alicyclic, or arylalkyl group, at least one $C_6$ to $C_{20}$ heterocyclic or carbocyclic aryl radical, or at least one $C_1$-$C_{20}$ alkyl, alicyclic, or arylalkyl group and a $C_6$ to $C_{20}$ heterocyclic or carbocyclic aryl radical, the aryl radical further optionally substituted with $R^1$ groups fitting the definition above; and an anionic borate moiety being represented by $[BX_aY_b]^-$, in which a and b are integers and a ranging from 0 to 3 and b ranging from 1 to 4 and a+b=4; X, which may be identical or different, are each a halogen atom, an OH functional group, or a $C_1$ to $C_{20}$ alkyl or alicyclic radical, and Y, which may be identical or different, are each a phenyl radical, at least one Y substituted by at least one element or electron-withdrawing substituent, such as a perfluoroalkyl group, $NO_2$, sulfonyl, or CN, or by one or more halogen atoms, or an aryl radical containing at least two aromatic ring members, optionally being further substituted by an electron withdrawing substituent.

Figure 1:
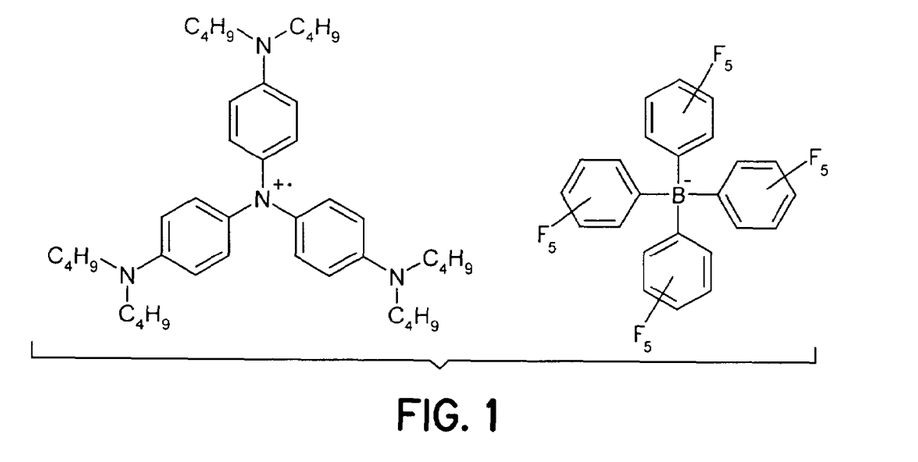
FIG. 1 is one embodiment of a light-absorbing aminium dye in accordance with the present invention.

In one exemplary embodiment, $R^1=R^2=R^3=4\text{-}G_2N\text{—}$ $C_6H_4$ wherein G is selected from the group consisting of methyl, ethyl, propyl, isopropyl, isobutyl, butyl, pentyl, isoamyl, hexyl, octyl, ethylhexyl, decyl, dodecyl, and benzyl, and the counterion, or $[BX_aY_b]^-$, is $(C_6F_5)_4B^-$, for example, to provide tris(4-dibutylaminophenyl)aminium tetrakis(pentafluorophenyl)borate when G=butyl as is shown in FIG. 1. This aminium dye shows a distinctive infrared absorption band at about 1000 nm. In other exemplary embodiments, the counterion may include $[3,5\text{-}(CF_3)_2C_6H_3]_4B^-$, $[(CF_3)C_6H_4]_4$ $B^-$, $[(C_6F_5)_3BF]^-$, $[(C_6F_5)_2BF_2]^-$, $[(C_6F_5)BF_3]^-$, or $[(CF_3)C_6H_2F_2]_4B^-$.

In another embodiment, the infrared light absorbing aminium borate salt of formula I may further include a host associated therewith to form, for example, an optical filter capable of filtering light. In one exemplary embodiment, $R^1=R^2=R^3=4$-dibutylaminophenyl, the counterion, or $[BX_a Y_b]^-$, is $(C_6F_5)_4B^-$, and the host is polycarbonate. The resulting filter has a peak absorption in the infrared in polycarbonate at about 1005 nm. In another exemplary embodiment, $R^1=R^2=R^3=4$-diethylaminophenyl, the counterion, or $[BX_a Y_b]^-$, is $(C_6F_5)_4B^-$, and the host is polycarbonate. The resulting filter has a peak absorption in the infrared at about 990 nm. In yet another exemplary embodiment, $R^1=R^2=R^3=4$-diethylaminophenyl, the counterion, or $[BX_aY_b]^-$, is $(C_6F_5)_4B^-$, and the host is a soft contact lens. The resulting lens has a peak absorption in the infrared at about 985 nm.

In another embodiment of the invention, there is provided an infrared dye composition comprising an infrared light-absorbing aminium borate salt of formula II:

An aminium radical cation being represented by $[(R^1R^2) N=C_6H_4=N(R^3R^4)]^{+\bullet}$, in which $R^1$ through $R^4$ are identical or different, optionally are linked to form rings, optionally linked to an oligomer or polymer, and are each a $C_6$ to $C_{20}$ heterocyclic or carbocyclic aryl radical, said groups $R^1$ through $R^4$ optionally being substituted by at least one $C_1$-$C_{25}$ alkoxy, $C_1$-$C_{25}$ alkyl, halo, $C_1$-$C_{25}$ mercapto, or amino group, the amino group being further incorporated into a carbocyclic or heterocyclic ring or substituted by at least one $C_1$-$C_{20}$ alkyl, alicyclic, or arylalkyl group, at least one $C_6$ to $C_{20}$ heterocyclic or carbocyclic aryl radical, or at least one $C_1$-$C_{20}$ alkyl, alicyclic, or arylalkyl group and a $C_6$ to $C_{20}$ heterocyclic or carbocyclic aryl radical, the aryl radical further optionally substituted with $R^1$ groups fitting the definition above; and an anionic borate moiety being represented by $[BX_aY_b]^-$, in which a and b are integers and a ranging from 0 to 3 and b ranging from 1 to 4 and a+b=4; X, which may be identical or different, are each a halogen atom, an OH functional group, or a $C_1$ to $C_{20}$ alkyl or alicyclic radical, and Y, which may be identical or different, are each a phenyl radical, at least one Y substituted by at least one element or electron-withdrawing substituent, such as a perfluoroalkyl group, $NO_2$, sulfonyl, or CN, or by one or more halogen atoms, or an aryl radical containing at least two aromatic ring members, optionally being further substituted by an electron withdrawing substituent.

Figure 2:
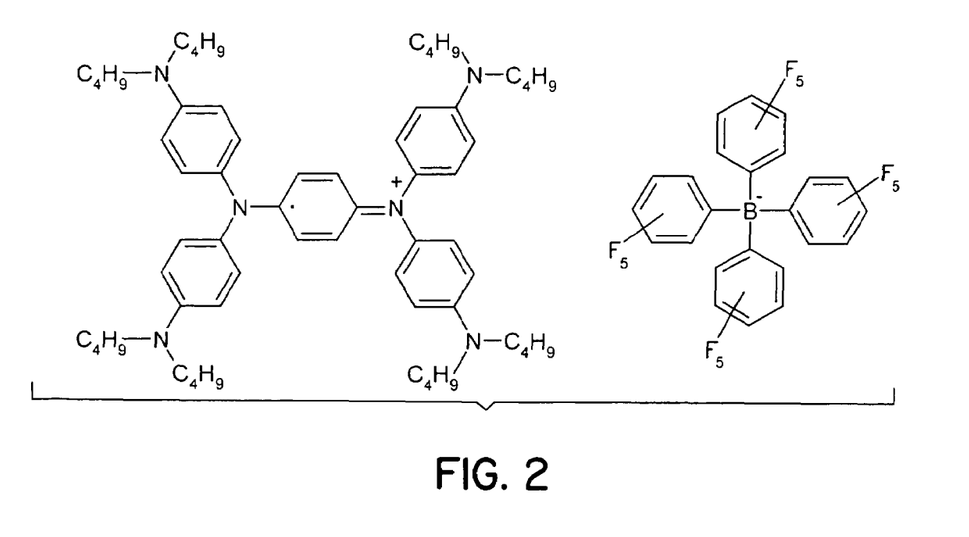
FIG. 2 is another embodiment of a light-absorbing aminium dye in accordance with the present invention.

In one exemplary embodiment, $R^1$ through $R^4$=4-$G_2$N—$C_6H_4$ wherein G is selected from the group consisting of methyl, ethyl, propyl, isopropyl, butyl, isobutyl, pentyl, isoamyl, hexyl, octyl, ethylhexyl, decyl, dodecyl, and benzyl, and the counterion, or $[BX_aY_b]^-$, is $(C_6F_5)_4B^-$, for example to provide bis(p-dibutylaminophenyl)[N,N-bis(p-dibutylaminophenyl)-4'-aminobiphenylyl]aminium tetrakis(pentaflurophenyl)borate when G=butyl as is shown in FIG. 2. This aminium dye shows a distinctive broad infrared absorption band that extends deep into the infrared. In other exemplary embodiments, the counterion may include $[3,5-(CF_3)_2C_6H_3]_4B^-$, $[(CF_3)C_6H_4]_4B^-$, $[(C_6F_5)_3BF]^-$, $[(C_6F_5)_2BF_2]^-$, $[(C_6F_5)BF_3]^-$, or $[(CF_3)C_6H_2F_2]_4B^-$.

In another embodiment, the infrared light absorbing aminium borate salt of formula II may further include a host associated therewith to form, for example, an optical filter capable of filtering light. In one exemplary embodiment, $R^1$ through $R^4$=di(n-butyl)aminophenyl, the counterion, or $[BX_aY_b]^-$, is $(C_6F_5)_4B^-$, and the host is toluene.

In yet another embodiment of the invention, there is provided an infrared dye composition comprising an infrared light-absorbing diimonium borate salt of formula III:

$$[(R^1R^2)N{=}Ar{=}N(R^3R^4)]^{2+}[Z_1]^-[Z_2]^- \qquad \text{III.}$$

A diimonium dication being represented by $[(R^1R^2)N{=}Ar{=}N(R^3R^4)]^{2+}$, in which Ar is a substituted or unsubstituted quinoidal phenyl, $R^1$ through $R^4$ are identical or different, optionally are linked to form rings, optionally linked to an oligomer or polymer, and are each either a $C_1$-$C_{20}$ alkyl, alicyclic, or arylalkyl group or a $C_6$ to $C_{20}$ heterocyclic or carbocyclic aryl radical, said groups $R^1$ through $R^4$ optionally being substituted by at least one $C_1$-$C_{25}$ alkoxy, $C_1$-$C_{25}$ alkyl, halo, $C_1$-$C_{25}$ mercapto, or amino group, the amino group being further incorporated into a carbocyclic or heterocyclic ring or substituted by at least one $C_1$-$C_{20}$ alkyl, alicyclic, or arylalkyl group, at least one $C_6$ to $C_{20}$ heterocyclic or carbocyclic aryl radical, or at least one $C_1$-$C_{20}$ alkyl, alicyclic, or arylalkyl group and a $C_6$ to $C_{20}$ heterocyclic or carbocyclic aryl radical, the aryl radical further optionally substituted with $R^1$ groups fitting the definition above; and first and second anionic moieties being represented by $[Z_1]^-$ and $[Z_2]^-$, one of $[Z_1]^-$ and $[Z_2]^-$ being selected from $SbF_6^-$, $ClO_4^-$, $AsF_6^-$, $PF_6^-$, $CF_3SO_3^-$, $BF_4^-$, and $[BX_aY_b]^-$, the other one of $[Z_1]^-$ and $[Z_2]^-$ of the form $[BX_aY_b]^-$, if each of $[Z_1]^-$ and $[Z_2]^-$ are of the form $[BX_aY_b]^-$ then each being identical or different, a and b of $[BX_aY_b]^-$ are integers and a ranging from 0 to 3 and b ranging from 1 to 4 and a+b=4; X, which may be identical or different, are each a halogen atom, an OH functional group, or a $C_1$ to $C_{20}$ alkyl or alicyclic radical, and Y, which may be identical or different, are each a phenyl radical, at least one Y substituted by at least one element or electron-withdrawing substituent, such as a perfluoroalkyl group, $NO_2$, sulfonyl, or CN, or by one or more halogen atoms, or an aryl radical containing at least two aromatic ring members, optionally being further substituted by an electron withdrawing substituent.

Figure 3:
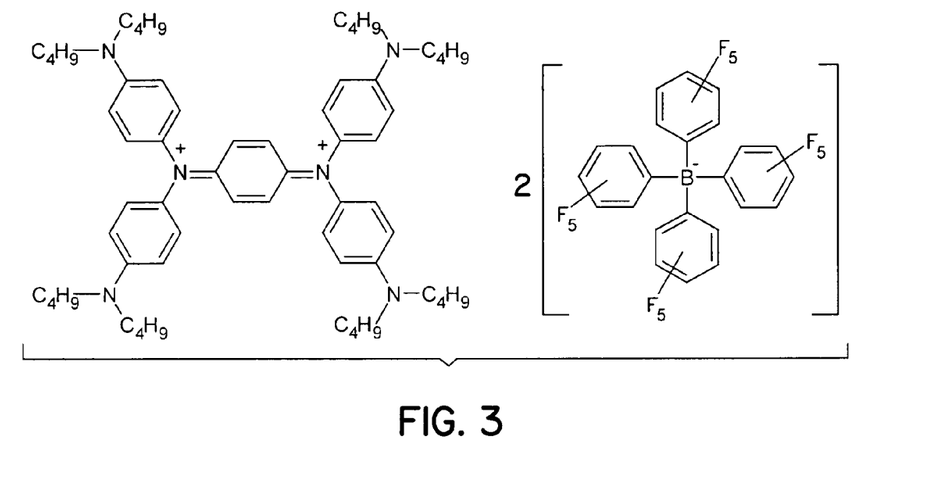
FIG. 3 is one embodiment of an light-absorbing diimonium dye in accordance with the present invention.

In one exemplary embodiment, Ar=$C_6H_4$, $R^1$ through $R^4$=4-$G_2$N—$C_6H_4$ wherein G is selected from the group consisting of methyl, ethyl, propyl, isopropyl, butyl, isobutyl, pentyl, isoamyl, hexyl, octyl, ethylhexyl, decyl, dodecyl, and benzyl, and the counterions, or $[Z_1]^-$ and $[Z_2]^-$, are both $(C_6F_5)_4B^-$ to provide, for example, N,N,N',N'-tetrakis(p-dibutylaminophenyl)diphenoquinone bis[imonium tetrakis(pentafluorophenyl)borate] when G=butyl as is shown in FIG. 3. This diimonium dye has a distinctive broad infrared absorption with relatively little absorption in the visible range. In another exemplary embodiment, Ar=$C_6H_4$, $R^1$ and $R^2$=4-dibutylaminophenyl, $R^3$ and $R^4$=butyl, and the counterions are both $(C_6F_5)_4B^-$. In other exemplary embodiments, the counterions may include $[3,5-(CF_3)_2C_6H_3]_4B^-$, $[(CF_3)C_6H_4]_4B^-$, $[(C_6F_5)_3BF]^-$, $[(C_6F_5)_2BF_2]^-$, or $[(C_6F_5)BF_3]^-$, or $[(CF_3)C_6H_2F_2]_4B^-$.

In another embodiment, the infrared light absorbing diimonium borate salt of formula III may further include a host associated therewith to form, for example, an optical filter capable of filtering light. In one exemplary embodiment, Ar=$C_6H_4$, $R^1$ through $R^4$=di(n-butyl)aminophenyl, the counterions, or $[Z_1]^-$ and $[Z_2]^-$, are both $(C_6F_5)_4B^-$, and the host is a soft contact lens.

Other suitable aminium and/or diimonium ions for the above discussed infrared dye compositions may be found in U.S. Pat. Nos. 3,440,257 and 3,484,467 to Susi et. al, U.S. Pat. No. 3,400,156 to Milionis et. al., and U.S. Pat. No. 5,686,639 to Cohen, all of which are hereby fully incorporated by reference herein in their entirety. Additional counterions may be found in U.S. Pat. Nos. 5,468,902, 5,550,265, 5,668,192, and 6,147,184 to Castellanos et. al., which is hereby fully incorporated by reference herein in its entirety.

In yet another embodiment of the invention, there is provided an infrared dye composition comprised of an infrared light-absorbing polymethine chromophore with a borate counterion of formula IV:

$$[\text{polymethine}]^+[BX_aY_b]^- \qquad \text{IV.}$$

The borate counterion, or borate anionic moiety, being represented by $[BX_aY_b]^-$, in which a and b are integers and a ranging from 0 to 3 and b ranging from 1 to 4 and a+b=4; X, which may be identical or different, are each a halogen atom, an OH functional group, or a $C_1$ to $C_{20}$ alkyl or alicyclic radical, and Y, which may be identical or different, are each a phenyl radical, at least one Y substituted by at least one element or electron-withdrawing substituent such as a perfluoroalkyl group, $NO_2$, sulfonyl, or CN, or by one or more halogen atoms, or an aryl radical containing at least two aromatic ring members, optionally being further substituted by an electron withdrawing substituent; and the cationic polymethine chromophore, as represented by $[\text{polymethine}]^+$, has a peak in its absorption spectrum between about 700 and 2000 nm and is optionally linked to an oligomer or polymer. These cationic polymethine chromophores are well known to those skilled in the art of infrared dyes, examples of polymethine dyes with suitable cationic polymethine chromophores include trimethine, pentamethine, heptamethine, chacogenopyrylium, hemicyanine, and streptocyanine dyes. A non-exhaustive list of suitable polymethine dyes may be found in a review by Fabian et. al. titled "Near Infrared Absorbing Dyes" and published in Chemical Reviews 92(6), 1197 (1992) which is hereby incorporated by reference herein in its entirety. In addition, spectra of many suitable polymethine dyes may be found in a book by M. Matsuoka titled "Absorption Spectra of Dyes for Diode Lasers" published by Bunshin Publishing Co, Tokyo (1990), which is hereby incorporated by reference herein in its entirety. Suitable counterions may be found in U.S. Pat. Nos. 5,468,902, 5,550,265, 5,668,192, and 6,147,184 to Castellanos et. al., which is hereby fully incorporated by reference herein in its entirety.

Figure 4:
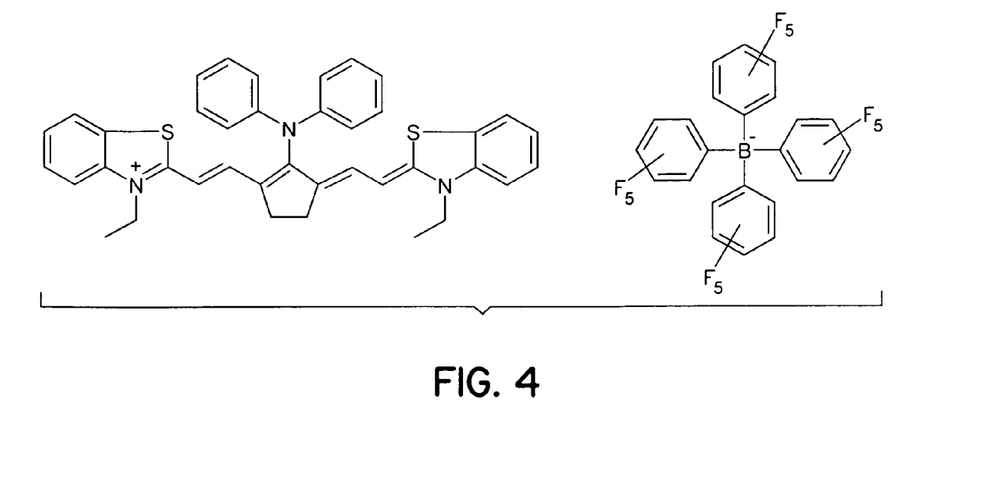
FIG. 4 is one embodiment of an infrared absorbing and fluorescing polymethine dye in accordance with the present invention.

In one exemplary embodiment, the cationic polymethine chromophore is the IR-140 chromophore and the borate counterion, or $[BX_aY_b]^-$, is $(C_6F_5)_4B^-$ to provide the polymethine dye as shown in FIG. 4. In other exemplary embodiments, the counterion may include $[3,5\text{-}(CF_3)_2C_6H_3]_4B^-$, $[(CF_3)C_6H_4]_4B^-$, $[(C_6F_5)_3BF]^-$, $[(C_6F_5)_2BF_2]^-$, $[(C_6F_5)BF_3]^-$, or $[(CF_3)C_6H_2F_2]_4B^-$.

In another embodiment of the invention, the infrared light absorbing polymethine chromophore with borate counterion of formula IV may further include a host associated with the light-absorbing polymethine salt to form, for example, an optical filter for filtering light. In one exemplary embodiment, the cationic polymethine chromophore is the IR-140 chromophore, the borate counterion, or $[BX_aY_b]^-$, is $(C_6F_5)_4B^-$, and the host is polystyrene. The IR-140 chromophore, which is an infrared absorbing and fluorescing polymethine (cyanine) dye, has very limited solubility in toluene as its perchlorate or tosylate salt and cannot be efficiently incorporated into polystyrene. However, when paired with the $(C_6F_5)_4B^-$, this chromophore is soluble in toluene and can be efficiently incorporated into polystyrene.

The light absorbing aminium, diimonium and polymethine salts, or infrared dye compositions, generally absorb infrared light over a range of wavelengths and are useful for various light-filtering and sensing applications. The compositions may further include more than one light-absorbing compound. The additional light-absorbing compound(s) may also be aminium salts, diimonium salts, polymethines, porphyrins, azaporphyrins, phthalocyanines, squarylium compounds, dithiolenes, etc. The infrared dye compositions may also include additional reflective, refractive and/or diffractive elements capable of filtering and/or transmitting optical radiation from the ultraviolet wavelengths through the infrared wavelengths. Furthermore, other dyes, light stabilizers, UV-absorbers, anti-oxidants, quenchers and the like may be included in the composition.

When combined with the host, the infrared light-absorbing compositions provide, for example, useful light-filtering or light-sensing elements or devices, such as optical filters including contact lenses, which may be fabricated by one of several conventional methods, such as injection molding, for incorporating the compound(s) into or onto various hosts. Again, the infrared elements include the host in combination with at least one of the new dye compositions. The host generally is a liquid, a gel, or a solid. For example, the host may be a matrix or thin-layered material or a film and may be a material selected from polycarbonate, polystyrene, polyvinyl chloride, polyacrylate, polyurethane, epoxy, polymethylmethacrylate, silicone, silicon-based polymers, glass, sol-gel, hydrogel, polycrystalline materials, plastic, cellulose derivatives and combinations thereof. The dye compositions may be, without limitation, a coating on, dispersed in, or an integral part of the host material, such as a lens or lens button defining a contact lens.

In addition, the dye compositions for use with infrared elements may include other additives or dyes to provide, for example, UV stabilization or a tailored spectral curve. The dye compositions also are useful in infrared elements in combination with other absorptive, reflective, refractive, or diffractive elements for optical radiation from the ultraviolet through the infrared, and may be chemically bound to an oligomer or polymer. And, the fluorescent compositions are useful as invisible or non-visible-light-interfering markers for sensing applications.

As indicated above, the dye compositions can be utilized, such as in processing or molding of filter elements, at unexpectedly higher temperatures and with unexpectedly greater retention of optical density than currently known infrared dyes. The dye compositions can also be utilized, such as in processing or molding of infrared filter or sensing elements, in lower polarity or lower polarizable hosts with unexpectedly higher solubility and optical density than currently known infrared dyes. The limited solubility of polymethine, aminium, and diimonium salts comprised of counterions, such as hexafluoroantimonate, hexafluoroarsenate, perchlorate, hexafluorophosphate, tetrafluoroborate, tosylate, etc., is most apparent in applications that require high optical densities in a low polarity hosts (See Examples 1-4 below).

Non-limiting examples of the preparation of various embodiments of the present invention follow:

EXAMPLE 1

An aminium borate salt $(4\text{-}Et_2NC_6H_4)_3N^{+\cdot}(C_6F_5)_4B^-$, i.e. tris(p-diethylaminophenyl)aminium tetrakis(pentafluorophenyl)borate, was prepared by the addition of a solution of 1 equivalent of $Ag^+$ $(C_6F_5)_4B^-$ in ether to a solution of $(4\text{-}Et_2NC_6H_4)_3N$ in acetone from about −80 to about 0° C. Upon warming to room temperature, the precipitate was filtered off and the filtrate was purified by chromatography on silica gel with methylene chloride eluent. The resulting oil obtained after evaporation of the solvent was treated with a fluorinated solvent, FC-80, to give a solid product.

EXAMPLE 2

Figure 5:
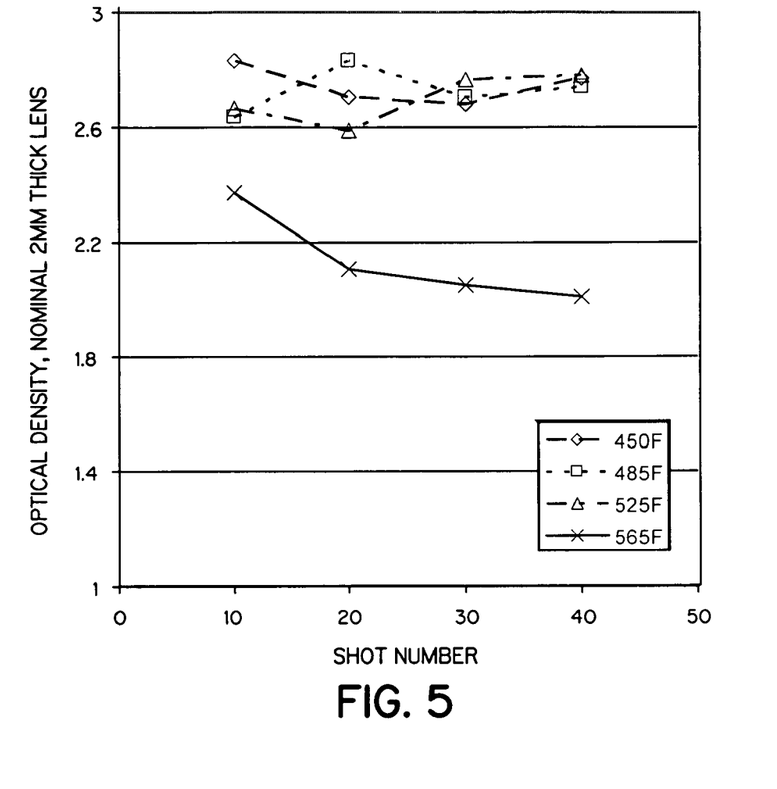
FIG. 5 is a graph of the optical density of a polycarbonate optical filter containing $(4\text{-}Et_2NC_6H_4)_3N^{+\bullet}(C_6F_5)_4B^-$ vs. shot number in a molding process to demonstrate thermal stability of the infrared dye composition.

A series of blends of 1.00 gm of the aminium borate salt $(4\text{-}Et_2NC_6H_4)_3N^{+\cdot}(C_6F_5)_4B^-$ from Example 1 and 3.00 pounds of polycarbonate resin pellets were molded separately at 450, 485, 525, and 565° F. to provide infrared absorbing filters. A steady state was reached at about shot 40. The optical densities of the parts were measured and are graphed in FIG. 5. Specifically, retention of optical density was observed between about 450 and 525° F. The retention of optical density at 565° F. was similar to that observed at about 480 to 500° F. with tris(4-dibutylaminophenyl)aminium hexafluoroantimonate. Therefore, the aminium borate salt $(4\text{-}Et_2NC_6H_4)_3N^{+\cdot}(C_6F_5)_4B^-$ showed about 60-80° F. greater thermal stability than a corresponding currently known aminium hexafluoroantimonate salt (not depicted in graph)

under similar molding conditions. When this experiment was repeated at 525° F. with corresponding $Ph_4B^-$, the dye completely decomposed.

EXAMPLE 3

A soft contact Accuvue® 2 lens was immersed in acetone and then in a solution of about 20 mg of $(Et_2NC_6H_4)_3N^{+\cdot}$ $(C_6F_5)_4B^-$ in about 5 mL of acetone for several minutes. The lens was then washed briefly in acetone and re-immersed in a contact lens wetting solution. The resulting lens had a peak optical density in the infrared at about 985 nm of about 1.5. When this experiment was repeated with the corresponding $SbF_6^-$ salt, the peak optical density was only about 0.4. When this experiment was repeated with a similar $Ph_4B^-$ salt, the peak optical density was only about 0.5.

EXAMPLE 4

Figure 6:
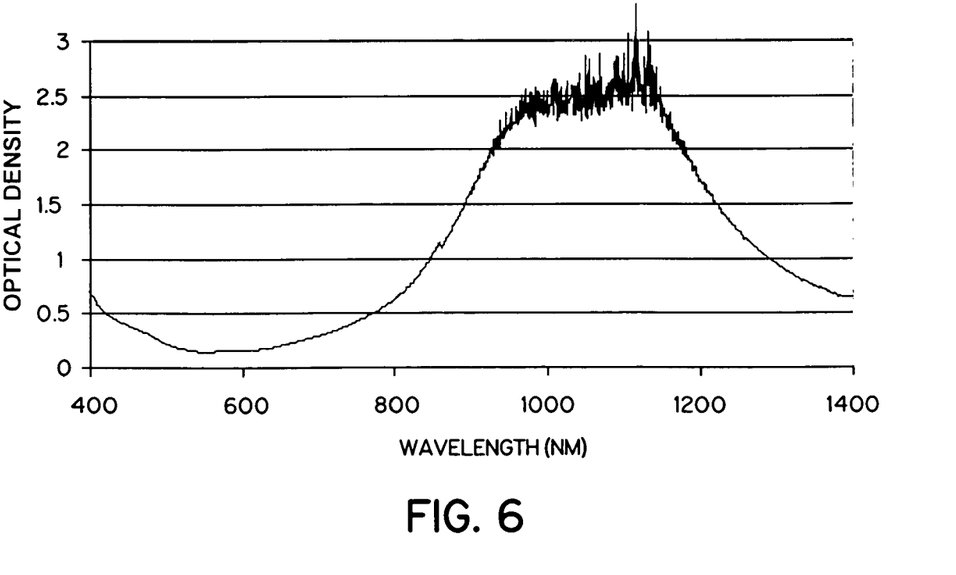
FIG. 6 is a visible-near infrared spectrum of a soft contact lens dyed with $[(Bu_2NC_6H_4)_2N=C_6H_4=N(C_6H_4NBu_2)_2]^{2+}$ $[(C_6F_5)_4B^-]_2$ that shows a peak optical density of about 2.5 in the infrared.

A soft contact Accuvue® 2 lens was immersed in acetone and then in a solution of about 20 mg of $[(Bu_2NC_6H_4)_2N=C_6H_4=N(C_6H_4NBu_2)_2]^{2+}[(C_6F_5)_4B^-]_2$ in about 5 mL of acetone for several minutes. The lens was then washed briefly in acetone and re-immersed in a contact lens wetting solution. The resulting lens had a peak optical density in the infrared at about 1100 nm of about 2.5. A spectrum of the lens is shown in FIG. 6. The noise in the spectrum is due to the high optical density combined with the small aperture used to measure the spectrum of the contact lens.

In addition to the above Examples 1-4, other exemplary embodiments of the aminium borate salt similarly may be prepared, for example, from $(4-Bu_2NC_6H_4)_3N$ and $Ag^+$ $(C_6F_5)_4B^-$, from $(4-Et_2NC_6H_4)_3N$ and $Ag^+[3,5-(CF_3)_2C_6H_3]_4B^-$, or from $(4-Bu_2NC_6H_4)_3N$ and $Ag^+[3,5-(CF_3)_2C_6H_3]_4B^-$ in a suitable solvent under conditions known to be useful for the synthesis of aminium cations. Exemplary embodiments of the diimonium borate salt similarly may be prepared, for example, from $[(4-Bu_2NCH_6H_4)_2N=C_6H_4=N(4-Bu_2NCH_6H_4)_2]$ and cupric nitrate followed by addition of about 2 equivalents of $Li[(C_6F_5)_4B^-]$ in a suitable solvent, e.g. acetone, under conditions known to be useful for the synthesis of diimonium cations. Suitable synthesis conditions may be found in U.S. Pat. No. 3,962,290 to Grosso hereby fully incorporated by reference herein. Also, exemplary embodiments of the polymethine borate similarly may be prepared, for example, from IR-140 tosylate and one equivalent of $LiB(C_6F_5)_4$ in 90:10 $CH_2Cl_2$:MeOH or another suitable solvent by ion exchange and extraction of lithium tosylate with water. Accordingly, all resulting products may be isolated and purified by commonly known techniques such as extraction, crystallization, and chromatographic separation.

Those skilled in the art will recognize that exchange of counterions such as hexafluoroantimonate, hexafluoroarsenate, perchlorate, hexafluorophosphate, tetrafluoroborate, or tosylate by the borate anions described herein can also be carried out for other cationic dyes that absorb or fluoresce in the visible spectral region. Such dyes include cyanine, xanthylium (rhodamine), oxazine, styryl, and pyridine dyes. Those skilled in the art will also recognize that such dyes with the borate anions would be expected to show increased thermal stability and improved solubility in non-polar hosts analogous to what is taught herein regarding near infrared light absorbing dyes.

In addition, the solution spectra of the borate dyes appear similar to those of hexafluoroantimonates or other counterion dyes in polar solvents and hosts and, therefore, the salts of the present invention may directly replace the known compositions in many applications. In addition, the new compositions may be used in applications where the thermal stability of the new borate compositions leads to greater retention of optical density in the resulting filter or filter element.

Furthermore, the new compositions may be used in applications where the solubility of the new borate compositions leads to less ion pairing and or greater optical density in the resulting filter or filter element.

Because the relationship between the thermal stability of aminium, diimonium, and polymethine dyes and the nature of the anion was not previously understood, a non-exhaustive list of the unexpected results that were observed with respect to the infrared absorbing dye compositions of the present invention is presented below:

that at molding temperatures of 525° F., at which aminium $SbF_6^-$ dyes rapidly decompose, the new tris(di(n-alkyl)phenyl)aminium cation radical borate dyes provided optical densities in polycarbonate that were, within experimental error, the same as those obtained at processing temperatures 60-80° F. lower;

that at molding temperatures of 565° F., at which aminium $SbF_6^-$ dyes are decomposed, the new tris(di(n-alkyl)phenyl) aminium cation radical dyes provided optical densities in polycarbonate that were greater than about 70% of the values obtained in polycarbonates molded at about 525° F.; and that, based on these observations, the thermal stability of the aminium borates of the present invention is unexpectedly about 60-80° F. greater than the thermal stability of current aminium hexafluoroantimonates under polycarbonate molding conditions.

In addition, because the relationship between the organic solvent-solubility of aminium, diimonium, and polymethine dyes and the nature of the anion was not previously recognized, a non-exhaustive list of the following unexpected results that were observed with respect to the infrared absorbing dye compositions of the present invention is presented below:

that, in non-polar solvents in which cationic dyes are generally insoluble, the aminium, diimonium, and polymethine borate salts of the present invention are freely soluble; and that, in a commercial Accuvue® soft contact lens, in which aminium $SbF_6^-$ dyes show only low solubility, the corresponding aminium $(C_6F_5)_4B^-$ dye of the present invention shows at least about 4 times greater solubility; and that, in a commercial Accuvue® soft contact lens, an tetrakis(di-n-butylaminophenyl) diimonium $2[(C_6F_5)_4B^-]$ dye of the present invention yields an optical density of greater than 2 at peak in the infrared.

Overall, therefore, the improvement in thermal stability and in solubility of the infrared absorbing borate salts of the present invention over that of previously reported compositions, is unexpected.

By virtue of the foregoing, there are provided novel compositions comprising infrared light absorbing dyes that are chemically, thermally and photochemically compatible with known manufacturing processes, and with known processes for deposition such as coatings or inks.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus and method, and illustrated examples described. Accordingly, departures may be made from such details with departing from the scope or spirit of the Applicant's general inventive concept.

What is claimed is:

1. An infrared dye composition comprising:
   an anionic borate moiety having the formula:

$[BX_aY_b]^-$ in which a and b are integers and a ranging from 0 to 3 and b ranging from 1 to 4 and a+b=4; X, which may be identical or different, are each a halogen atom, an OH functional group, or a $C_1$ to $C_{20}$ alkyl or alicyclic radical, and Y, which may be identical or different, are each a phenyl radical, at least one Y substituted by at least one element or electron-withdrawing substituent or by one or more halogen atoms, or an aryl radical containing at least two aromatic ring members; and
   an aminium radical cation that has at least one absorption peak in the near infrared wavelength region between about 700 and 2000 nm, the aminium radical cation having the formula:

$(4\text{-}G_2N\text{—}C_6H_4)_3N^{+\cdot}$ wherein G is selected from the group consisting of methyl, ethyl, propyl, isopropyl, butyl, isobutyl, pentyl, isoamyl, hexyl, octyl, ethylhexyl, decyl, dodecyl, and benzyl.

2. The composition of claim 1 wherein G=butyl.

3. The composition of claim 1 wherein the electron withdrawing substituent includes one of a perfluoralkyl group, $NO_2$, sulfonyl, and CN.

4. The composition of claim 1 wherein said anionic borate moiety includes one of $[3,5\text{-}(CF_3)_2C_6H_3]_4B^-$, $[(CF_3)C_6H_4]_4B^-$, $[(C_6F_5)_3BF]^-$, $[(C_6F_5)_2BF_2]^-$, $[(C_6F_5)BF_3]^-$, $(C_6F_5)_4B^-$, and $[(CF_3)C_6H_2F_2]_4B^-$.

5. The composition of claim 1 wherein the anionic borate moiety is linked to one of an oligomer and polymer.

6. An infrared dye composition comprising:
   an anionic borate moiety selected from one of $[3,5\text{-}(CF_3)_2C_6H_3]_4B^-$, $[(CF_3)C_6H_4]_4B^-$, $[(C_6F_5)_3BF]^-$, $[(C_6F_5)_2BF_2]^-$, $[(C_6F_5)BF_3]^-$, $(C_6F_5)_4B^-$, and $[(CF_3)C_6H_2F_2]_4B^-$; and
   an aminium radical cation that has at least one absorption peak in the near infrared wavelength region between about 700 and 2000 nm, the aminium radical cation having the formula:

$[(R^1)_m][(R^2)_n][(R^3)_{3-(m+n)}]N^{+\cdot}$ in which m and n are integers ranging from 0 to 3 and m+n ranges from 0 to 3; groups $R^1$, $R^2$ and $R^3$ are identical or different, optionally are linked to form rings, and are each a $C_6$ to $C_{20}$ heterocyclic or carbocyclic aryl radical, said groups $R^1$, $R^2$ and $R^3$ optionally being substituted by at least one $C_1$-$C_{25}$ alkoxy, $C_1$-$C_{25}$ alkyl, halo, $C_1$-$C_{25}$ mercapto, or amino group, the amino group being further substituted by at least one $C_1$-$C_{20}$ alkyl, alicyclic, or arylalkyl group or incorporated into a carbocyclic or heterocyclic ring.

7. The composition of claim 6 wherein the anionic borate moiety is linked to one of an oligomer and polymer.

* * * * *

UNITED STATES PATENT AND TRADEMARK OFFICE
CERTIFICATE OF CORRECTION

PATENT NO. : 7,498,123 B2
APPLICATION NO. : 11/071509
DATED : March 3, 2009
INVENTOR(S) : Paul A. Cahill It is certified that error appears in the above-identified patent and that said Letters Patent is hereby corrected as shown below:

Column 2, TITLE PAGE under "Other Publications" change "Stabllisiertes" to --Stabilisiertes--.

Column 6, line 49, change "$R^1 \cdot R^2 = R^3 = 4$" to --$R^1 = R^2 = R^3 = 4$--.

Column 8, line 1, after "Ar" insert --=--.

Column 8, line 11, after "Ar" insert --=--.

Column 12, line 15, after "Ar" insert --=--.

Column 12, line 35, after "Ar" insert --=--.

Column 16, line 21, after "F" delete ".".

Signed and Sealed this

Fifteenth Day of June, 2010

David J. Kappos
*Director of the United States Patent and Trademark Office*